United States Patent [19]

Koga et al.

[11] Patent Number: 4,741,977
[45] Date of Patent: May 3, 1988

[54] MAGNETIC SHEET

[75] Inventors: Keiji Koga; Keiko Tsuchiya; Kazunori Tamazaki; Tsutomu Aoyama; Yuichi Kubota, all of Nagano, Japan

[73] Assignee: TDK Corporation, Tokyo, Japan

[21] Appl. No.: 896,458

[22] Filed: Aug. 14, 1986

[30] Foreign Application Priority Data

Aug. 20, 1985 [JP] Japan ............... 60-182769
Aug. 21, 1985 [JP] Japan ............... 60-183283

[51] Int. Cl.⁴ ............... G11B 5/702; G11B 5/716
[52] U.S. Cl. ............... 428/694; 427/131; 428/695; 428/900
[58] Field of Search ......... 428/694, 695, 900; 360/135; 427/128, 131

[56] References Cited

U.S. PATENT DOCUMENTS

| | | | |
|---|---|---|---|
| 3,373,997 | 3/1968 | Berndt et al. | 360/135 |
| 4,316,927 | 2/1982 | Kimura et al. | 428/695 |
| 4,539,266 | 9/1985 | Miyazaki | 360/135 |
| 4,583,145 | 4/1986 | Mönnich et al. | 428/695 |
| 4,587,157 | 5/1986 | Brock et al. | 428/695 |
| 4,601,946 | 7/1986 | Iida et al. | 428/695 |
| 4,645,724 | 2/1987 | Ojima et al. | 428/695 |

OTHER PUBLICATIONS

Japan Electronic Communications Society (Report MR85-19), Aug. 22, 1985 (Japanese Document Plus Abridged Translation).

*Primary Examiner*—Paul J. Thibodeau
*Attorney, Agent, or Firm*—Oblon, Fisher, Spivak, McClelland & Maier

[57] ABSTRACT

A magnetic sheet comprising a disk-shaped substrate and a magnetic layer is loaded in a magnetic sheet operating device, typically electronic camera comprising a magnetic head for performing recording and reproducing operations on the sheet while rotating the sheet. The magnetic layer is formed from a composition comprising a magnetic powder and a binder having a specified complex elastic modulus.

5 Claims, 1 Drawing Sheet

MAGNETIC SHEET

BACKGROUND OF THE INVENTION

This invention relates to a magnetic sheet, and more particularly, to a magnetic sheet to be loaded in a magnetic sheet operating device such as an electronic or electromagnetic camera for recording magnetic signals on the sheet.

Magnetic sheets capable of recording magnetic signals representative of a still image in an annular track are known in the art. It is a common practice to accommodate such a magnetic sheet in a jacket for convenience of handling and storage. The magnetic sheet comprises a flexible substrate and a magnetic layer formed thereon. Usually, a pair of magnetic layers are coated on the opposed surfaces of the substrate partially for the purpose of preventing the sheet from warping.

On use, a magnetic sheet is mounted on a drive shaft of a magnetic sheet operating device and rotated at a high speed, for example, at 3,600 rpm. While the sheet is being rotated, a magnetic head is forced against the sheet to perform recording and reproducing operations on the sheet. A stabilizer member holds the opposite surface of the sheet to control the degree of contact between the sheet and the head. In this way, recording-/reproducing operation is performed on the magnetic sheet in an electronic camera while the sheet is rotated at a high speed and pressed with a sufficient force to induce deformation. Thus the magnetic sheet must be highly durable.

For the same reason, an output of reproduction from the magnetic sheet somewhat depends on the relative location of the head and the quantity of deformation of the sheet. Output varies with the degree of contact between the head and the sheet. Thus the magnetic sheet must also have appropriate rigidity or stiffness. Because of the above-mentioned operation mode, the magnetic sheet simultaneously undergoes high speed sliding motion by rotation and deformation by bending. That is, the magnetic sheet experiences a unique mechanical fatigue of different type from those of conventional magnetic tape and disk.

There is a strong need for a magnetic sheet satisfying these considerations.

SUMMARY OF THE INVENTION

An object of the present invention is to provide a novel and improved magnetic sheet having high durability.

The present invention is directed to a magnetic sheet comprising a disk-shaped substrate having opposed major surfaces and a magnetic layer formed on at least one major surface of the substrate and comprising a magnetic powder and a binder. The magnetic sheet is used in a magnetic sheet operating device comprising a magnetic head for performing recording and reproducing operations on the sheet while rotating the sheet and a stabilizer member for controlling the contact of the sheet with the head. According to the feature of the invention, the binder of the magnetic layer has a mechanical dissipation factor tan $\delta$ of up to 0.05 as measured at 20° C. and 10 Hz.

BRIEF DESCRIPTION OF THE DRAWINGS

The invention will be more fully understood by reading the following description taken in conjunction with the accompanying drawings, in which.

DETAILED DESCRIPTION OF THE INVENTION

Figure 2:
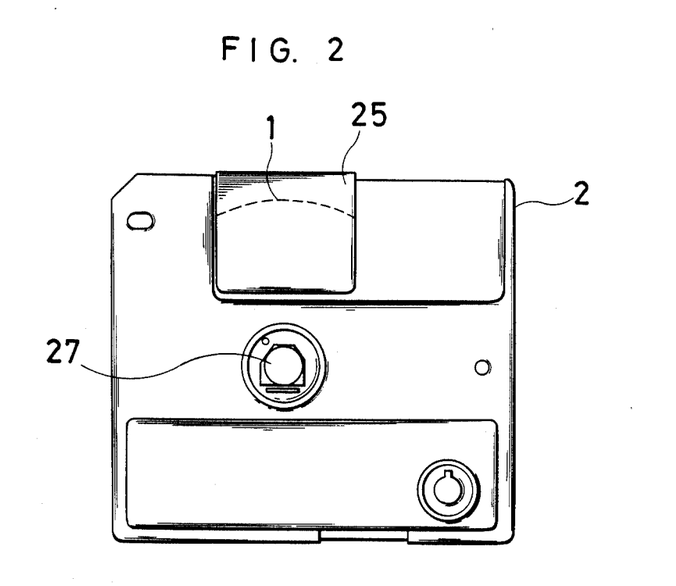
FIG. 2 is a plan view of a jacket having a magnetic sheet received therein.

Referring to FIG. 2, there is illustrated a jacket having a magnetic sheet received therein. A disk-shaped magnetic sheet 1 is received for rotation in a rectangular jacket casing 2. The magnetic sheet 1 is provided with a plurality of annular tracks (not shown) for magnetically recording image signals indicative of still image information. The jacket casing 2 is locally opened to define a window 25 through which part of the magnetic sheet 1 is exposed. The jacket casing 2 also include a central opening corresponding to a central portion of the magnetic sheet 1. The magnetic sheet 1 has at its center a driven hub formed with a driven hole 27.

Figure 1:
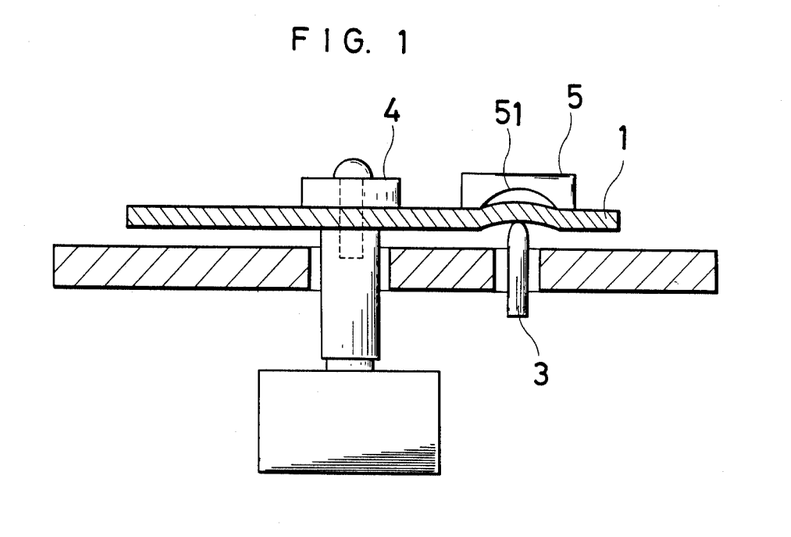
FIG. 1 is a schematic, partially cross sectional, elevation of a magnetic sheet operating device illustrating the operation of a magnetic sheet therein.

On use, a magnetic sheet operating device, typically an electronic camera is loaded with the jacket or sheet. FIG. 1 illustrates the magnetic sheet loaded in the camera while the jacket is omitted for illustration purpose. The camera includes a magnetic head 3, a drive motor, a drive shaft, a chuck 4 associated with the drive shaft, and a stabilizer 5 opposed to the head 3 and having a recess 51 serving as a stabilizing surface. On operation, the magnetic head 3 is moved forward through the jacket window to contact the magnetic sheet 1 whereby a plurality of image signals are magnetically recorded on or reproduced from the sheet 1.

The drive shaft is inserted into the driven hole 27 in the central hub of the sheet and firmly secured to the hub by the chuck 4. The sheet 1 mounted on the drive shaft is rotated at a high speed, for example, at 3,600 rpm. While being rotated, the sheet is forced against the head 3. The stabilizer member 5 is brought in contact with the opposite side of the sheet 1 to control the degree of contact between the sheet 1 and the head 3. Under these conditions, recording and reproducing operations are performed on the sheet.

As previously described, the magnetic sheet of the present invention includes a disk-shaped substrate which is coated on both the major surfaces with magnetic layers partially for the purpose of preventing the sheet from warping. Usually, the substrate is a flexible substrate. No particular limitation is imposed on the flexible materials of which the substrates are made. The preferred flexible materials are flexible synthetic resins such as polyesters, polyimides, polyamides, poly(ethylene-2,6-naphthalate), polyarylates, polysulfones, polycarbonates, aramide resins. Most commonly used are biaxially oriented polyester films.

The substrates generally have a thickness of 30 to 36 $\mu$m, preferably 32 to 34 $\mu$m. Their outer diameter generally ranges from 4.68 cm to 4.71 cm.

A pair of magnetic layers are formed on the opposed major surfaces of the substrate by applying onto the substrate surfaces a magnetic coating composition of a magnetic powder dispersed in a suitable binder.

The binders used in the practice of the present invention include various thermosetting binders and various radiation curable binders. The binders may be used alone or in admixture of two or more. According to the present invention, it is necessary that the cured binder has a mechanical dissipation factor tan δ of up to 0.05 as measured at 20° C. and 10 Hz.

The mechanical dissipation factor used herein is defined in connection with complex elastic modulus as tan δ=E″/E′ wherein E′ is storage or dynamic modulus and E″ is loss modulus. The dissipation factor tan δ is measured as follows. First, a specimen for measurement is prepared by diluting a binder or binders conforming to the intended binder composition with a suitable solvent such as a mixture of methyl ethyl ketone and toluene to form a lacquer liquid. The lacquer liquid is then coated on a release paper sheet by means of a bar coater and dried to a dry thickness of 30 to 40 μm. The coating is cured or hardened by a suitable curing method using either radiation or heat depending on the particular binder composition used. The thus cured or set film is measured for tan δ in a visco-elastometer by a forced vibration method at a driving vibration frequency of 10 Hz (sine wave), an initial load of 0.25 kg/mm$^2$, and 20° C.

Cured binder films having a tan δ of more than 0.05 measured as above show a durability of the magnetic sheet reduced below a critical level. In the range of tan δ of not more than 0.05, the lower the tan δ, the more is improved the durability. However, as tan δ is lowered to below 0.03, the resulting durability reaches a certain plateau. Thus, tan δ preferably ranges from 0.01 to 0.05 and more preferably from 0.02 to 0.04.

In one preferred embodiment of the present invention, the cured binders have a storage modulus E′ of at least 100 kg/mm$^2$ as measured at 40° C. and 10 Hz. The storage modulus E′ is measured in the same way as for tan δ. Namely, the cured or set film prepared by the same procedure is measured for storage modulus in a visco-elastometer by a forced vibration method at a driving vibration frequency of 10 Hz (sine wave), an initial load of 0.25 kg/mm$^2$, and 40° C.

The durability of the magnetic sheet is critically increased when the thus measured E′ of the cured binder is equal to or higher than 100 kg/mm$^2$. No particular upper limit is imposed on E′. Since the general upper limit of E′ is about 500 kg/mm$^2$, the preferred range of E′ is from 100 to 400 kg/mm$^2$.

The binder materials having tan δ and E′ in the above-specified ranges include thermosetting binders and radiation curable binders.

The thermosetting and reactive resins used herein as the binder are those resins which, upon heating after coating and drying, are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/- triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer, a vinyl chloride-vinyl alcohol-vinyl acetate copolymer, a vinyl chloride-vinylidene chloride copolymer, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; and mixtures of any of the foregoing members.

Particularly preferred are mixtures of an epoxy resin, a butyral resin, and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese patent application Kokai No. 49-131101.

These thermosetting resins may generally be cured by heating in an oven at about 50° to 80° C. for about 6 to 100 hours.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizaing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U.C.C.), and analogues. These copolymers may be modified to be radiation sensitive by incorporating acrylic, maleic, or allyl double bonds. They may additionally contain carboxylic units.

(2) Saturated polyesater resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with $SO_3Na$ or the like, for example, Vyron 53S (trade name, Toyobo K.K.). They may be modified to be radiation sensitive.

(3) Polyvinyl alcohol resins

Included are polyvinyl alcohol, butyral resins, acetal resins, formal resins, and copolymers of such units. They may be modified to be radiation sensitive by acting on a hydroxyl group in them.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins. These resins may be modified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PV-Polefin copolymers), polyamide resins, polyimide resins, phenol resins, spiro-acetal resins, hydroxyl-containing acrylic esters, and acrylic resins containing at least one methacrylate as a polymer component.

Examples of the elastomers and prepolymers are presented below.

(1) Polyurethane elastomers and prepolymers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH terminal group as a polar group.

Also included are monomers having active hydrogen capable of reacting with an isocyanate group and an unsaturated double bond capable of radiation curing, for example, mono- and diglycerides of long chain fatty acids having an unsaturated double bond.

(2) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capable of generating a radical upon exposure to radiation to facilitate crosslinking and polymerization.

(3) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic

Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacrylate, polyfunctional oligoester acrylates (e.g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

(Special acrylate A)

(Special acrylate B)

(Special acrylate C)

(Special acrylate J)

A: acrylic acid   X: polyhydric alcohol
Y: polybasic acid (Special acrylate K)

A: acrylic acid
M: dihydric alcohol
N: dibasic acid
(Special acrylate L)

Next, processes for the synthesis of the radiation curable binders will be described.

(a) Synthesis of acryl-modified products (radiation sensitive modified resins) of vinyl chloride-vinyl acetate copolymeric resins.

A 5-liter four-necked flask is charged with 750 parts of a partially saponified vinyl chloride-vinyl acetate copolymer having an OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation thereof will be described later) is added and then, 0.012 parts of tin octylate and 0.012 parts of hydroquinone are added. Reaction is continued in a nitrogen stream at 80° C. until the reaction rate of NCO reaches 90%. At the end of reaction, the reaction solution is cooled and 1250 parts of methyl ethyl ketone is added for dilution.

Preparation of 2-hydroxylethyl methacrylate (2HEMA) adduct of tolylenediisocyanate (TDI)

In a 1-liter four-necked flask, 348 parts of TDI is heated at 80° C. in a nitrogen stream. A mixture of 260 parts of 2-ethylene methacrylate, 0.07 parts of tin octylate, and 0.05 parts of hydroquinone is then added dropwise while the reactor is cooled so as to control the temperature to 80° to 85° C. After the dropwide addition, the reaction is continued to completion at 80° C. for 3 hours with stirring. At the end of reaction, the contents are taken out of the flask and cooled, obtaining a white paste-like product which is 2HEMA adduct of TDI based on the preparation method. (b) Synthesis of acryl-modified products (radiation sensitive modified resins) of butyral resins A 5-liter four-necked flask is charged with 100 parts of a butyral resin (BM-S, manufactured by Sekisui Chemicals K.K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is contunued in a nitrogen stream at 80° C. until the reaction rate of NCO reaches or exceeds 90%. At the end of reaction, the reaction solution is cooled and an amount of methyl ethyl ketone is added for dilution.

(c) Synthesis of acryl-modified products (radiation sensitive modified resins) of saturated polyester resins A flask is charged with 100 parts of a saturated polyester resin (Vyron RV-200, manufactured by Toyobo K.K.), 116 parts of toluene, and 116 parts of methyl ethyl ketone. After the flask is heated at 80° C. to dissolve the contents into a solution, 3.55 parts of 2HEMA adduct of TDI (synthesized as above) is added and then, 0.007 parts of tin octylate and 0.007 parts of hydroquinone are added. Reaction is continued in a nitrogen stream at 80° C. until the reaction rate of NCO reaches or exceeds 90%.

(d-1) Synthesis of acryl-modified products (radiation sensitive modified resins) of epoxy resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued at 80° C. until the acid value is lowered to below 5.

(d-2) Synthesis of acryl-modified products (radiation sensitive modified resins) of phenoxy resins A 3-liter four-necked flask is charged with 600 parts of an OH group-bearing phenoxy resin (PKHH manufactured by U.C.C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a nitrogen stream at 80° C. until the reaction rate of NCO reaches or exceeds 90%. The resultant modified phenoxy product has a molecular weight of 35,000 and one double bond per molecule.

(e) Synthesis of acryl-modified products (radiation sensitive modified resins) of urethane elastomers A reactor is charged with 250 parts of a urethane prepolymer of isocyanate-terminated diphenylmethane diisocyanate (MDI) type (Nippolane 3119 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(f) Synthesis of acryl-modified products (radiation sensitive modified elastomers) of terminally urethane-modified polyether elastomers A reactor is charged with 250 parts of a polyether (PTG-500 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(g) Synthesis of acryl-modified products (radiation sensitive modified elastomers) of polybutadiene elastomers A reactor is charged with 250 parts of a low-molecular weight, hydroxyl-terminated polybutadiene (Poly BD Liquid Resin R-15, manuactured by Sinclair Petro-Chemical), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation.

Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation-curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, $\alpha$-methylbenzoin, $\alpha$-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

It will be understood that the tan $\delta$ and E' of each of these binders may be readily empirically determined by the above-mentioned measurement procedure.

The magnetic powders used in the magnetic layer according to the present invention include magnetic metal particles and cobalt-coated iron oxide particles, $\gamma$-$Fe_2O_3$ particles, barium ferrite particles, and $CrO_2$. They may be used alone or in admixture.

The magnetic metal particles used herein include
 (1) those obtained by starting with iron oxyhydroxides such as $\alpha$-FeOOH (goethite), $\beta$-FeOOH (akaganite), and $\gamma$-FeOOH (lepidocrocite); iron oxides such as $\alpha$-$Fe_2O_3$, $\gamma$-$Fe_2O_3$, $Fe_3O_4$, and $\gamma$-$Fe_2O_3$-$Fe_3O_4$ (solid solution); and iron particles doped with one or more metals selected from Co, Mn, Ni, Ti, Bi, Be, and Ag and having an aluminum or silicon compound adsorbed or applied on their surface, and heat reducing them in a reducing gas stream to produce a magnetic powder consisting of iron or consisting of a major proportion of iron,
 (2) those obtained by the liquid phase reduction of a metal salt in water with $NaBH_4$, and
 (3) those obtained by evaporating metals in an inert gas atmosphere under a reduced pressure.

The magnetic metal particles may have a composition consisting essentially of elemental iron, cobalt, and nickel alone, and alloys thereof, and the individual metals and their alloys both having an additional metal added thereto, for example, one or more metals selected from Cr, Mn, Co, and Ni, and optionally, from Zn, Cu, Zr, Al, Ti, Bi, Ag, and Pt.

It is also contemplated to add a minor proportion of a non-metallic element or elements such as B, C, Si, P, and N to these metals. Partially nitrided metal magnetic particles such as $Fe_4N$ may also be included.

Also, the magnetic metal particles may have an oxide coating on the surface thereof. The magnetic recording media using magnetic metal particles having an oxide coating are advantageously resistant to any influences of an ambient environment such as a reduction in magnetic flux density due to the influence of temperature and humidity and a deterioration of properties due to the occurrence of rust in the magnetic layer. However, there arises a problem that the magnetic layer has an increased electric resistance which causes troubles due to electric charging during use.

The magnetic metal particles may have either needle or granular form and a proper choice may be made depending upon the intended use of the magnetic recording medium. Needle, that is, acicular form is preferred in the case of magnetic disks.

The preferred form of $\gamma$-$Fe_2O_3$ particle is obtained, for example, by dehydrating $\alpha$-FeOOH (goethite) at 400° C. or higher into $\alpha$-$Fe_2O_3$, reducing in hydrogen gas at 350° C. or higher into $Fe_3O_4$, and oxidizing at 250° C. or lower.

The cobalt-coated iron oxide particles may preferably be $\gamma$-$Fe_2O_3$ particles having $Co^{2+}$ diffused in a thin layer of several to several ten angstrom deep from the surface.

The barium ferrites used herein include a hexagonal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc.

Berrium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983).

The magnetic powder and the binder may be mixed in a weight ratio of from 6/1 to 1/1.

The magnetic sheet of the present invention prefers that a lubricant be present at least on the recording side surface of the magnetic layer.

The lubricants on the magnetic layer are effective for reducing the friction between the magnetic sheet and a head during recording and reproducing operations and for improving the durability of the magnetic sheet. The preferred lubricants are fatty acid esters having a melting point of lower than 30° C. and conforming to the general formula: $R^1COOR^2$ wherein $R^1$ is an alkyl radical having 10 to 22 carbon atoms, preferably 12 to 18 carbon atoms, and $R^2$ is an alkyl radical having 3 to 18 carbon atoms, preferably 4 to 16 carbon atoms. They may be used alone or in admixture. Some illustrative examples of the fatty acid esters include butyl laurate, dodecyl laurate, butyl myristate, octyl myristate, isooctyl myristate, isocetyl myristate, butyl palmitate, octyl palmitate, butyl stearate, isobutyl stearate, and isocecyl stearate.

Lubricants in the form of fatty acid esters of the above formula wherein $R^1$ contains less than 10 carbon atoms and/or $R^2$ contains less than 3 carbon atoms tend to scatter away during the high speed rotation of the magnetic sheet because of less firm adherence to the magnetic layer, and thus do not maintain lubrication for an extended period of time. Lubricants in the form of fatty acid esters of the above formula wherein $R^1$ contains more than 22 carbon atoms and/or $R^2$ contains more than 18 carbon atoms or having a melting point of 30° C. or higher are tacky and undesirably tend to transfer and adhere to the head and the stabilizer member, resulting in a rapid loss of lubrication.

In order that the lubricant be present on the surface of the magnetic sheet, any suitable application techniques may be used.

A common technique is by dispersing the magnetic powder and the lubricant in the binder and coating the substrate with the dispersion.

Alternatively, after a magnetic layer is previously formed on the substrate by coating it with a dispersion of magnetic powder in binder, only the lubricant is applied onto the magnetic layer as a topcoat by coating or evaporation. In this case, the lubricant may be locally or entirely distributed over the surface of the magnetic layer, if desired. It is also possible to apply the lubricant as a topcoat in addition to incorporating it in the magnetic layer.

The amount of the lubricant added ranges from about 2 to about 20 parts by weight per 100 parts by weight of the binder.

The magnetic layer may further contain any optional additives such as abrasives, anti-static agents, other lubricants, and dispersants depending on the intended application of the magnetic sheet.

The abrasives used herein include carbon black, graphite, $SiO_2$, $TiO_2$, $Al_2O_3$, $Cr_2O_3$, SiC, CaO, $CaCO_3$, zinc oxide, goethite, $\alpha$-$Fe_2O_3$, talc, kaolin, $CaSO_4$, boron nitride, fluorinated graphite, molybdenum disulfide, zinc sulfide. Preferred among them are calcium carbonate, kaolin, zinc oxide, zinc sulfide, goethite, and carbon black.

The amount of the abrasive used preferably ranges from about 10 to about 200 parts by weight per 100 parts by weight of the binder. The addition of too larger amounts of the abrasive are undesirable because the resultant coating becomes brittle and produces more dropouts.

Examples of the other lubricants which also serve as a dispersant include fatty acids such as caprilic acid, capric acid, lauric acid, myristic acid, palmitic acid, stearic acid, behenic acid, oleic acid, elaidic acid, linoleic acid, linolenic acid, and stearolic acid; metal soaps in the form of alkali metal (e.g., Li, Na, K, etc.) and alkaline earth (e.g., Mg, Ca, Ba, etc.) salts of such fatty acids; and lecithin. Also employable are higher alcohols and their sulfuric acid esters, surface-active agents, titanium coupling agents, and silane coupling agents. These lubricant/dispersants may be added in amounts of about 1 to about 20 parts by weight per 100 parts by weight of the binder.

In addition to the above-mentioned lubricants, silicone oil, graphite, molybdenum disulfide, tungsten disulfide, and fatty acid esters of monobasic fatty acids with monohydric alcohols which are outside the presently defined fatty acid esters may also be used as the lubricant.

Any of the additives which are commonly used in the magnetic layer of this type may also be employed in the magnetic layer of the present invention. Such additives include anti-static agents, for example, natural surface-active agents such as saponin; nonionic surface-active agents such as alkylene oxides, glycerins, and glycidols; cationic surface-active agents such as higher alkyl amines, quaternary ammonium salts, pyridine and other heterocyclic compounds, phosphonyl and sulfonyl compounds; anionic surface-active agents such as compounds containing an acid group such as carboxylic acid, sulfonic acid, phosphoric acid, sulfate, and phosphate groups; and amphoteric surface-active agents such as amino acids, aminosulfonic acids, and sulfuric and phosphoric acid esters of aminoalcohols.

The magnetic layer has a thickness of about 1 to about 5 $\mu$m, preferably about 2 to about 4 $\mu$m.

The magnetic sheet preferably has a thickness in the range of about 38 $\mu$m to about 42 $\mu$m because a good head contact is ensured within this range.

The magnetic sheet of the present invention is operated as follows.

As shown in FIG. 1, the magnetic sheet 1 is mounted on and secured to the drive shaft by the chuck 4, and rotated at 3,000 to 3,600 rpm while it is subjected to recording/reproducing operation. During the operation, the magnetic head 3 is advanced in abutment with the sheet 1 while the contact of the sheet with the head is controlled by the stabilizer member 5 opposed to the head 3.

The advanced position of the magnetic head 3 is approximately 0.02 mm to 0.20 mm beyond the reference or originally set level of the magnetic sheet 1 (lower surface in the figure). The stabilizer member 5 is set at a position approximately $-0.1$ mm to $+0.1$ mm apart from the reference level of the magnetic sheet (the upper surface in the figure). The stabilizer recess 51 serving as a stabilizing surface has a radius of curvature of about 5 mm to 20 mm and a transverse distance of about 5 mm to 20 mm.

The magnetic sheet of the present invention is characterized by an increased output and high durability since the magnetic layer is bound with a binder having a specific dissipation factor tan $\delta$ and optionally has a specific ester applied.

EXAMPLES

Examples of the present invention are given below by way of illustration and not by way of limitation. All parts are by weight. MW is molecular weight.

EXAMPLE 1

(A) Vinyl chloride-vinyl acetate-vinyl alcohol copolymer having an acrylic double bond incorporated (also containing maleic acid, MW=40,000)

(B) Polyester urethane elastomer having an acrylic double bond incorporated (MW=30,000)

(C) Polyester urethane elastomer having an acrylic double bond incorporated (MW=5,000)

(D) Pentaerythritol triacrylate

Ingredients (A) to (D) were mixed in different proportions (in parts by weight) as shown in Table 1 to form 100 parts by weight of binder mixtures and diluted with 200 parts by weight of a 50/50 methyl ethyl ketone/toluene mixed solvent, obtaining lacquer solutions.

The lacquer solutions were coated on release paper sheets with the aid of a bar coater and dried at 40° C. for 24 hours to a dry thickness of 30 to 40 μm. Using an electron-curtain type electron accelerator (manufactured by ESI), the coatings were exposed to electron radiation in a nitrogen atmosphere under conditions: an accelerating voltage of 150 keV, an electrode current of 20 mA, and a total irradiation dose of 5 Mrad, obtaining the cured coatings, that is, binder films.

After removal from the release paper sheets, the cured binder films were measured for mechanical dissipation factor tan δ and storage moludus E' in a viscoelastic spectrometer (manufactured by Iwamoto Mfg. K.K.) at a forced vibration frequency of 10 Hz (sine wave) and an initial load of 0.25 kg/mm².

The results are shown in Table 1.

Disks were made by preparing magnetic coating compositions as formulated below using these lacquer solutions as a binder, and then applying the compositions onto substrates to form magnetic layers.

| Magnetic coating composition | Parts by weight |
|---|---|
| Fe alloy ferromagnetic needle powder (length 0.3 μm, breadth 0.04 μm, Hc 1500 Oe) | 300 |
| Lacquer solution | 300 |
| α-Al₂O₃ | 6 |
| Solvent (50/50 MEK/toluene) | 700 |
| Stearic acid | 4 |

These ingredients were milled for dispersion for 45 hours in a ball mill. The thus obtained magnetic coating composition was gravure coated on both the major surfaces of a polyester base sheet of 34 μm thick and dried with hot air to drive off the solvent. The coated sheet was surface smoothened through calender rolls and cured with electron radiation under the same conditions as used in curing the binder films. Both the magnetic layers had a thickness of 3.0 μm.

The sheet was blanked to form disks having a diameter of 47 mm. The disks were subjected to a durability test.

In the durability test, the disks containing 50 tracks were continuously reproduced at 7 MHz under the optimum head contact conditions. A variation of reproduced outputs from 25 tracks among the 50 tracks was measured. The lapse of time until the output was reduced by 3 dB was considered as a durable life.

The head used is a ferrite head having a width of 2 mm, a thickness of 120 μm, a gap of 0.3 μm. Upon reproduction, the head was advanced 0.02 to 0.1 mm beyond the reference level of the disk. The disk was rotated at 3,600 rpm. The stabilizer member was located 0.01 mm apart from the disk. The stabilizer recess had a radius of curvature of 10 mm and a transverse distance of 10 mm.

The results are shown in Table 1.

TABLE 1

| Sample No. | Binder No. | Binder composition, part by weight | | | | tan δ @ 20° C. | E', kg/mm² @ 40° C. | Life, hour |
| | | A | B | C | D | | | |
|---|---|---|---|---|---|---|---|---|
| 101 | 1 | 45 | 0 | 45 | 10 | 0.030 | 108 | 173 |
| 102 | 2 | 60 | 20 | 5 | 15 | 0.032 | 146 | 150 |
| 103* | 3 | 60 | 30 | 0 | 10 | 0.070 | 57 | 80 |
| 104* | 4 | 45 | 40 | 0 | 15 | 0.102 | 51 | 40 |
| 105* | 5 | 45 | 45 | 0 | 10 | 0.120 | 54 | 11 |

*outside the scope of the invention

The data in Table 1 clearly show that the disks of the present invention perform well for an extended period of time. That is, magnetic sheets (sample Nos. 101 and 102) having a magnetic layer based on a binder having a mechanical dissipation factor tan δ of up to 0.05 as measured at 20° C. and 10 Hz and a storage modulus E' of at least 100 kg/mm² as measured at 40° C. and 10 Hz display improved durability.

EXAMPLE 2

(K) Vinyl chloride-vinyl acetate-vinyl alcohol copolymer (MW=35,000)
(L) Polyester urethane elastomer (MW=30,000)
(M) Polyisocyanate (MW=700)

Ingredients (K) to (M) were mixed in different proportions (in parts by weight) as shown in Table 2 to form 100 parts by weight of binder mixtures and diluted with 200 parts by weight of a 50/50 methyl ethyl ketone/toluene mixed solvent, obtaining lacquer solutions. Following the procedure of Example 1, the lacquer solutions were coated on release paper sheets and dried to a dry thickness of 30 to 40 μm. The coatings were cured by heating at 60° C. for 24 hours, obtaining the thermoset coatings, that is, binder films.

The thermoset binder films were measured for mechanical dissipation factor tan δ and storage moludus E' by the same procedure as in Example 1.

The results are shown in Table 2.

Disks were made by preparing magnetic coating compositions as formulated below using these lacquer solutions as a binder.

| Magnetic coating composition | Parts by weight |
|---|---|
| Co—γ-Fe₂O₃ (length 0.3 μm, breadth 0.04 μm, Hc 600 Oe) | 300 |
| Lacquer solution except isocyanate (M) | 300 |
| α-Al₂O₃ | 6 |
| Stearic acid | 6 |

The procedure used was substantially the same as in Example 1. The ingredients were milled for dispersion. The magnetic coating composition was gravure coated on both the major surfaces of a polyester base sheet of 34 μm thick, dried with hot air, and then thermoset by heating at 60° C. for 24 hours. Both the magnetic layers had a thickness of 3.0 μm. The sheet was blanked to form disks having a diameter of 47mm. The disks were subjected to a durability test in the same manner as in Example 1.

The results are shown in Table 2.

TABLE 2

| Sample No. | Binder No. | Binder composition, part by weight | | | tan δ @ 20° C. | E', kg/mm² @ 40° C. | Life, hour |
| | | K | L | M | | | |
|---|---|---|---|---|---|---|---|
| 201 | 21 | 60 | 30 | 10 | 0.018 | 146 | 150 |
| 202 | 22 | 40 | 40 | 20 | 0.020 | 156 | 130 |
| 203* | 23 | 20 | 60 | 20 | 0.069 | 95 | 90 |

TABLE 2-continued

| Sample No. | Binder No. | Binder composition, part by weight K | L | M | tanδ @ 20° C. | E', kg/mm² @ 40° C. | Life, hour |
|---|---|---|---|---|---|---|---|
| 204* | 24 | 40 | 50 | 10 | 0.081 | 57 | 15 |
| 205* | 25 | 25 | 65 | 5 | 0.148 | 13 | 10 |

*outside the scope of the invention

The data in Table 2 clearly show that the disks of the present invention perform well for an extended period of time. That is, magnetic sheets (sample Nos. 201 and 202) having a magnetic layer based on a binder having a mechanical dissipation factor tan δ of up to 0.05 and a storage modulus E' of at least 100 kg/mm² display improved durability.

Futhermore, the results of Examples 1 and 2 reveal that irrespective of whether the binder is of radiation curable type or thermosetting type, the magnetic layers, and hence, the magnetic sheets of the present invention are satisfactorily effective as long as the binder has physical values of tan δ and E' falling within the presently specified ranges.

EXAMPLE 3

Disk samples were prepared by the same procesure as in Example 1 except that 10 parts by weight of the following lubricants were added to the series of magnetic coating compositions used in Example 1.

| Lubricant | | Melting point |
|---|---|---|
| Lub. I: | octyl myristate | 16.8° C. |
| Lub. II: | isocetyl stearate | −3.0° C. |
| Lub. III: | docosyl behenate | 75.0° C. |
| Lub. IV: | butyl caproate | −64.3° C. |
| Lub. V: | hexacosyl stearate | 73.0° C. |
| Lub. VI: | ethyl laurate | −1.8° C. |
| Lub. VII: | myristic acid | |

It is to be noted that Lubs. III to VII are outside the scope of the fatty acid esters as specified in the present invention.

The disks were examined for durability by the same test procedure as described in Example 1.

The results are shown in Table 3.

TABLE 3

| Sample No. | Binder No. | Lubricant | tanδ @ 20° C. | E', kg/mm² @ 40° C. | Life, hour |
|---|---|---|---|---|---|
| 301 | 1 | Lub. I | 0.030 | 108 | 290 |
| 302 | 2 | Lub. I | 0.032 | 146 | 270 |
| 303* | 3* | Lub. I | 0.070 | 57 | 90 |
| 304* | 4* | Lub. I | 0.102 | 51 | 22 |
| 305* | 5* | Lub. I | 0.120 | 54 | 5 |
| 306 | 1 | Lub. II | 0.030 | 108 | 315 |
| 307 | 1 | Lub. III* | 0.030 | 108 | 95 |
| 308 | 1 | Lub. IV* | 0.030 | 108 | 170 |
| 309 | 1 | Lub. V* | 0.030 | 108 | 78 |
| 310 | 1 | Lub. VI* | 0.030 | 108 | 150 |
| 311 | 1 | Lub. VII* | 0.030 | 108 | 115 |

*outside the scope of the invention

As seen from the data of Table 3, magnetic sheets (samples Nos. 301 and 302) having a magnetic layer containing a preferred fatty acid ester lubricant in addition to a binder having a specific tan δ value show further improved durability as compared with magnetic sheets (sample No. 312) having a magnetic layer containing only a binder having a specific tan δ value although all they fall within the scope of the present invention.

No substantial improvement is achieved in durability by incorporating a preferred fatty acid ester lubricant in a binder where the binder has a tan δ value outside the specific range of the present invention (see sample Nos. 303 to 305). The durability is rather less improved when a binder having a specific tan δ value is combined with a fatty acid ester outside the scope as specified herein (see sample Nos. 307 to 311). These facts indicate that only a combination of a binder having a specific tan δ value with a specific fatty acid ester lubricant exerts the synergistic effect of improving the durability of magnetic sheets.

EXAMPLE 4

Disk samples were prepared by the same procesure as in Example 2 except that 10 parts by weight of the lubricants used in Example 3 were added to the series of magnetic coating compositions used in Example 2.

The disks were examined for durability by the same test procedure as described in Example 1.

The results are shown in Table 4.

TABLE 4

| Sample No. | Binder No. | Lubricant | tanδ @ 20° C. | E', kg/mm² @ 40° C. | Life, hour |
|---|---|---|---|---|---|
| 401 | 21 | Lub. I | 0.018 | 146 | 310 |
| 402 | 22 | Lub. I | 0.020 | 156 | 325 |
| 403* | 23* | Lub. I | 0.069 | 95 | 87 |
| 404* | 24* | Lub. I | 0.081 | 57 | 12 |
| 405* | 25* | Lub. I | 0.148 | 13 | 4 |
| 406 | 21 | Lub. III* | 0.018 | 146 | 70 |
| 407 | 21 | Lub. VII* | 0.018 | 146 | 143 |

*outside the scope of the invention

The data of Table 4 also demonstrates the benefit of the present invention. It is indicated that only a combination of a binder having a specific tan δ value with a specific fatty acid ester lubricant exerts the synergistic effect of improving the durability of magnetic sheets.

We claim:

1. In a magnetic sheet comprising a disk-shaped substrate having opposed major surfaces and a magnetic layer formed on at least one major surface of the substrate and comprising a magnetic powder and a radiation-curable binder; said magnetic sheet being used in a magnetic sheet operating device comprising a magnetic head for performing recording and reproducing operations on the sheet while rotating the sheet and a stabilizer member for controlling the contact of the sheet with the head, the improvement wherein the radiation-curable binder of the magnetic layer has a mechanical dissipation factor tan δ of up to 0.05 as measured at 20° C. and 10 Hz.

2. The magnetic sheet of claim 1 wherein the binder has a storage modulus E' of at least 100 kg/mm² as measured at 40° C. and 10 Hz.

3. The magnetic sheet of claim 1 wherein a compound represented by the general formula:

$$R^1COOR^2$$

wherein $R^1$ is an alkyl radical having 10 to 22 carbon atoms, and $R^2$ is an alkyl radical having 3 to 18 carbon atoms, and having a melting point of lower than 30° C. is present on at least the recording side surface of the magnetic layer.

4. The magnetic sheet of claim 1 wherein said magnetic layer is present on both of the opposed major surfaces of the substrate.

5. The magnetic sheet of claim 1 wherein the magnetic sheet is provided with annular tracks along which a plurality of image signals are magnetically recordable.

* * * * *